(No Model.)  6 Sheets—Sheet 1.

F. H. RICHARDS.
WEIGHING MACHINE.

No. 600,026.  Patented Mar. 1, 1898.

Witnesses:
O. W. Smith
Fred. J. Dole.

Inventor:
F. H. Richards (No Model.)
6 Sheets—Sheet 3.

F. H. RICHARDS.
WEIGHING MACHINE.

No. 600,026. Patented Mar. 1, 1898.

Witnesses:
O. W. Smith
Fred. J. Dole.

Inventor:
F. H. Richards (No Model.)

F. H. RICHARDS.
WEIGHING MACHINE.

No. 600,026.

6 Sheets—Sheet 4.

Patented Mar. 1, 1898.

Witnesses:
O. W. Smith
Fred. J. Dole.

Inventor:
F. H. Richards.

(No Model.) 6 Sheets—Sheet 6.

F. H. RICHARDS.
WEIGHING MACHINE.

No. 600,026. Patented Mar. 1, 1898.

Witnesses:
O. W. Smith
Fred. J. Dole

Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 600,026, dated March 1, 1898.

Application filed June 19, 1897. Serial No. 641,412. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object being to provide an improved machine of this character adapted for automatically weighing and delivering various kinds of granular and free-flowing substances with rapidity and precision.

Figure 1:
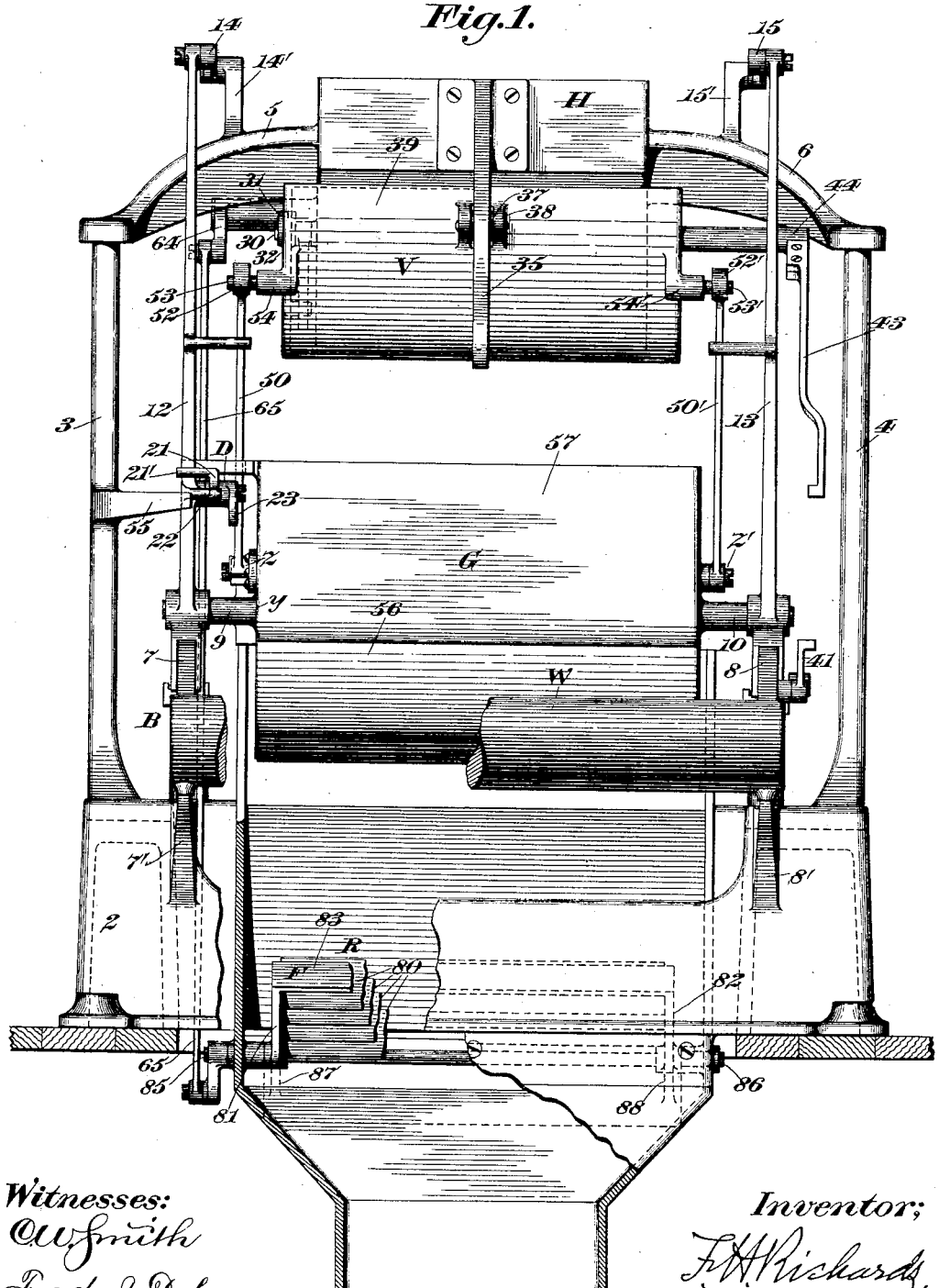

In the drawings accompanying and forming part of this specification, Figure 1 is a rear elevation of my improved weighing-machine. Figs. 2, 3, 4, 5, and 6 are side elevations of the same as seen from the left in Fig. 1, showing the positions occupied by the different parts during the making and discharging of a load, respectively, and during the partial return of the load-receiver to its primary or upright position. Figs. 7 and 8 are detail views hereinafter more particularly described.

Similar characters designate like parts in all the figures of the drawings.

The framework for sustaining the various parts of the weighing mechanism may be of any suitable or preferred construction, it consisting in the present case of the base or bed 2, from which rise the side frames 3 and 4 and the brackets 5 and 6, which extend oppositely from the supply-chute or hopper H.

The weighing mechanism embodies as a part thereof a load-discharger, which may be of any suitable type. In the present case the load-discharger of the weighing mechanism consists of a tilting or oscillatory load-receiver, as G, carried in some suitable manner by a scale-beam, as B, or equivalent device. The scale-beam B, which is pivotally mounted in the usual manner on the base of the machine, consists of a pair of longitudinal members 7 and 8, joined at the rear by the counterweight W. The load-receiver has on its opposite sides the projecting trunnions or pivots 9 and 10, journaled in the upright rods 12 and 13, constituting a suitable carrier for the load-receiver, the said rods having guide-links 14 and 15 pivoted at their upper ends and likewise connected to the posts 14' and 15' on the brackets 5 and 6, respectively. The rods 12 and 13 have notched bearings of ordinary construction at their lower ends working against the well-known knife-edge pivots on the poising ends of the beam-arms 7 and 8.

The load-receiver is so mounted that when empty its center of gravity is located at one side of its center of movement, (herein illustrated as the right,) said center of gravity being changed to the opposite side of the center of movement as the load is built up, whereby said load-receiver can tilt toward its discharging position or until a suitable projection thereon abuts against a detent, as a latch, disposed in the path of movement of said projection, said detent and projection being remotely situated from each other when the load-receiver is empty, whereby the latter will be maintained by its own weight in its primary or upright position. The detent or latch for arresting the movement of the load-receiver when it drops from its primary to its intermediate position is illustrated, respectively, in Figs. 2 and 3 and is designated by D, and it consists in the present case of an angle-lever pivoted at 20 to the upright rod 12, the arm 21 of said detent or latch normally resting on the stop 22 on the rod 12 and the arm 23 being disposed in the path of movement of the projection 24, fixed on the load-receiver.

Figure 2:
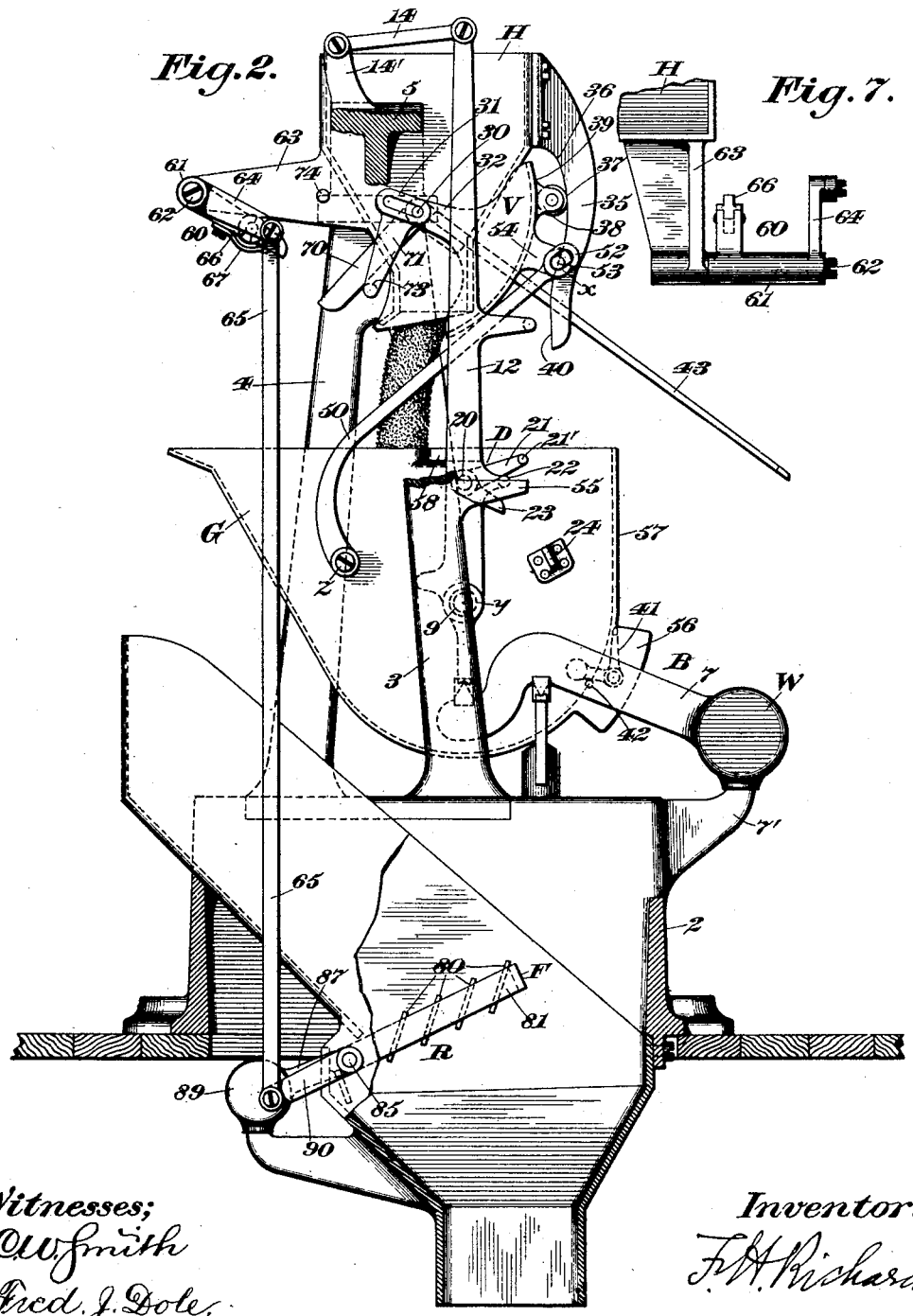
Figure 3:
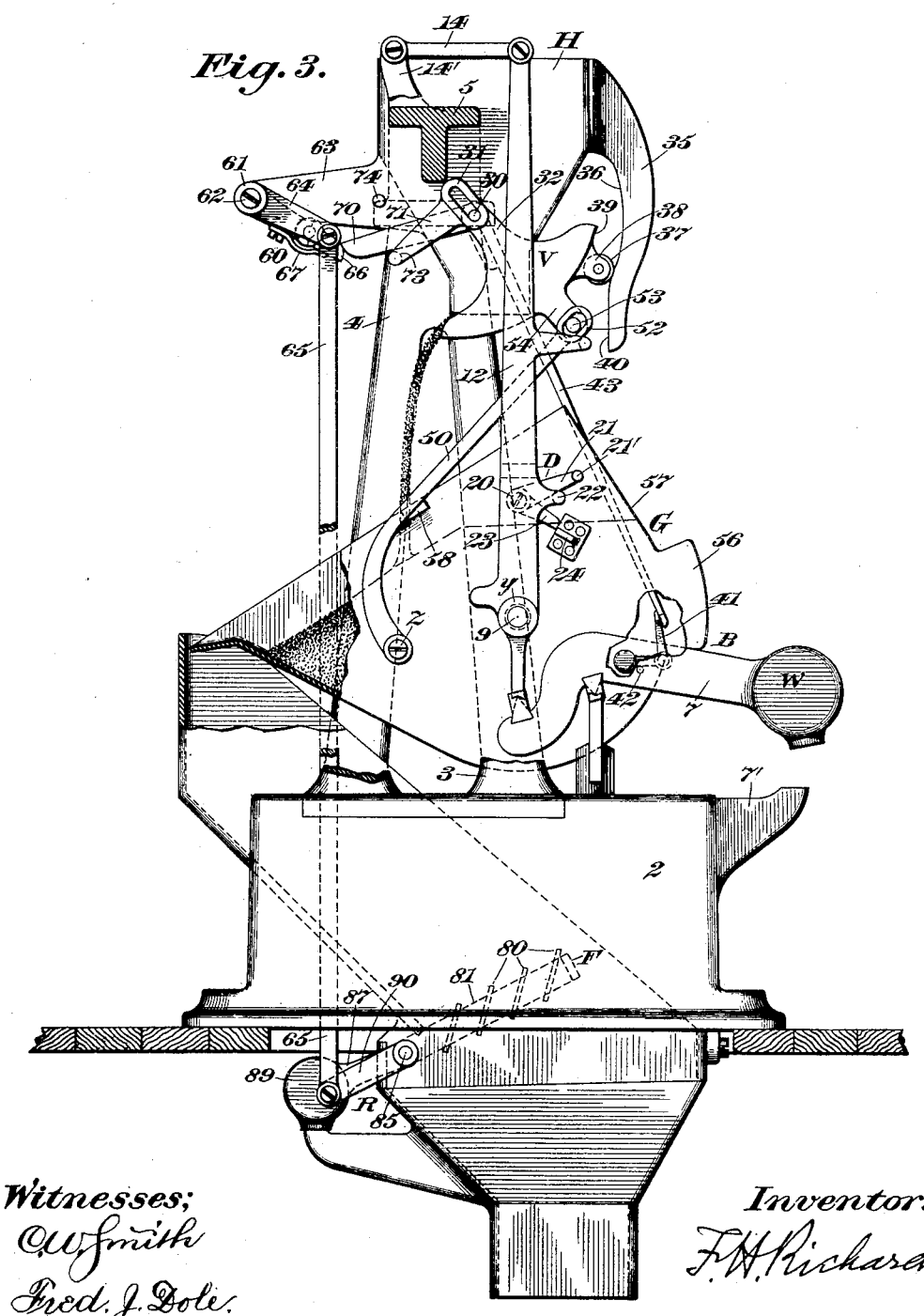

In Fig. 2 the load-receiver is empty, the weight W of the beam B resting on the usual supports 7' and 8' on the base and the full volume of the supply flowing from the hopper H into the empty load-receiver. When the load-receiver is empty, as represented in Fig. 2, the center of gravity will be situated to the right of its center of movement. When, however, the load is partially completed or at the commencement of the drip period, as illustrated in Fig. 3, the center of gravity will be shifted to the left of the center of movement, so that the load-receiver can tilt down and until the projection 24 abuts against the latch-arm 23, the usual supply-valve during this stage of the operation being swung from its wide-open to its drip position, at which time its further progress is interrupted to permit the passage of the drip-supply into the load-receiver to complete the load. On the completion of the load by the drip-stream, as will hereinafter appear, the load-receiver will descend below the so-called "poising-line," and during this period of the operation the latch D will be tripped to release the load-receiver, whereby it can descend to its third position (shown in Fig. 5) to discharge the load.

The supply-hopper H, hereinbefore described, will have a stream-controller or valve of suitable construction, such as V, for regulating the passage of material from the hopper H to the load-receiver G, said valve V being of the "pan" type and being also supported for reciprocatory movements in planes transverse to each other, so that at a predetermined period in its operation the valve can transmit its weight to the load-receiver, thereby to cause the latter to descend promptly and also impart a sufficient thrust to cause it instantly to tilt to its load-discharging position.

The valve V is preferably self-closing, it having a preponderance of weight below its support or supports to insure this action. The supports for the valve consist of the projecting pivots, as 30, on each side of the hopper, which pass through longitudinal loops, as 31, on the arms 32 at opposite sides of the valve, whereby said valve can reciprocate in one plane as it opens and closes and whereby it may be also reciprocated in a transverse plane at certain intervals in its operation.

Means will be provided for causing the movement of the valve through a certain path for a predetermined length of time, so that the valve cannot apply its force to the weighing mechanism to affect the accuracy of said mechanism during such action. The device in the present case for obtaining this result consists of the track or guide 35, which is secured to and depends from the hopper H and has a curved surface, as 36, defined by an arc struck from the center of the valve support or supports, a suitable projection, as an antifriction-roll 37, supported between the lugs 38 on the valve-plate 39, being adapted to run in contact with said curved surface until the commencement of the poising period, so that the lower ends of the loops 31 will be held against the projecting pivots 30 on the hopper.

The curved surface 36 of the guide-track 35 is of such a length as to hold the valve against movement for a predetermined period of time in a plane transverse to that of its opening and closing movements, and said guide 35 is of such construction as to release the valve at a point immediately preceding the poising period, said guide-track 35 having a straight face 40 departing from the lower end of the curved face 36, so that when the antifriction-roll 37 reaches a point in vertical line with the straight face 40 the valve V will be released so far as the guide 35 is concerned; but at this point the further action of the valve will be interrupted by a detent on the weighing mechanism, such as the by-pass 41, of ordinary construction, pivoted to the beam-arm 8 and counterweighted, as usual, the counterweighted arm of the by-pass resting on the stop 42 on the beam.

Figure 4:
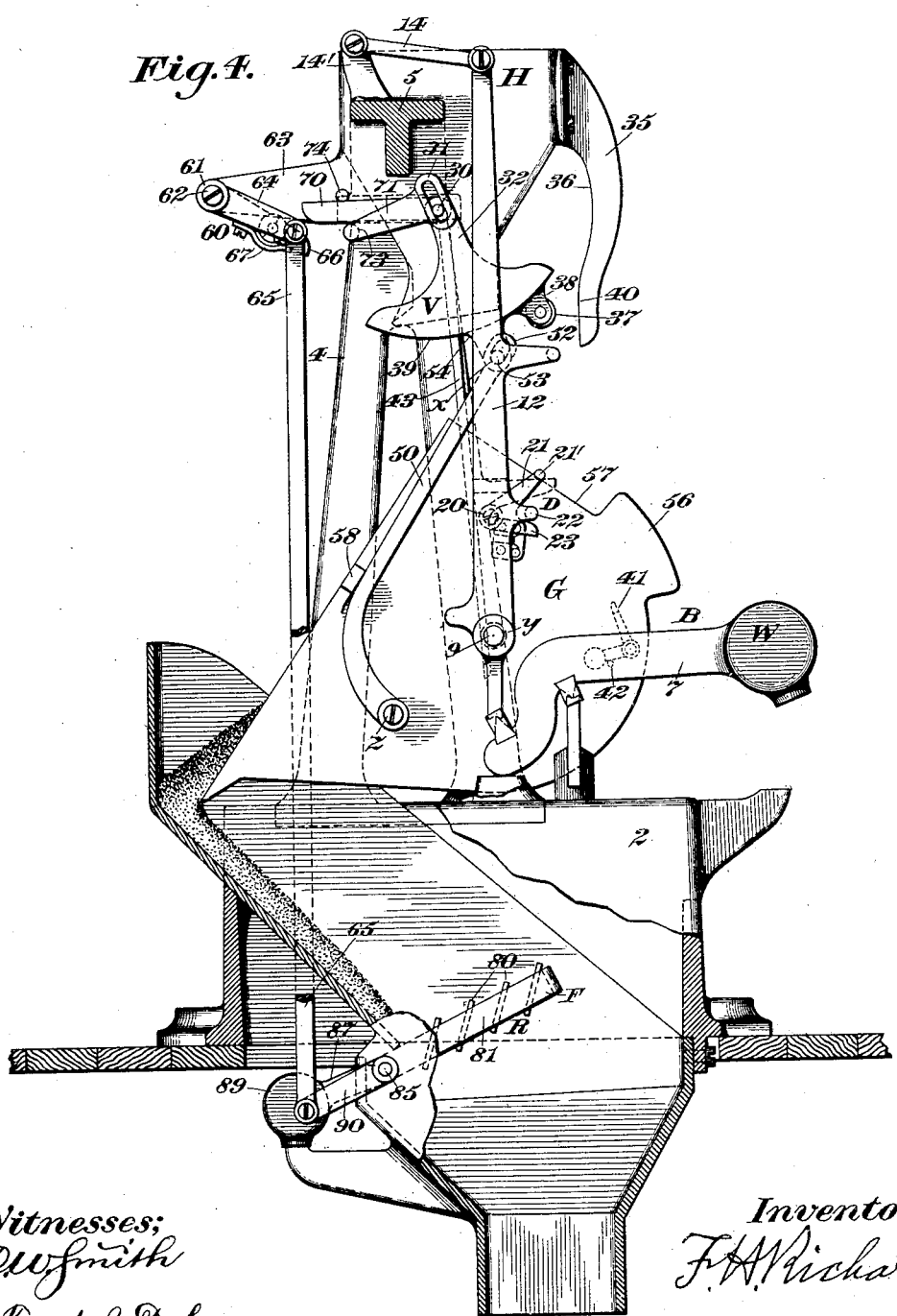

The detent or by-pass stop 41 of the beam B is adapted to be engaged by a suitable device operative with the valve V, such as the rod 43, secured to the extension 44 on said valve. When the projection or roll 37 on the valve V has passed substantially out of contact with the curved guide-surface 36, as shown in Fig. 3, the depending rod 43 will strike the by-pass 41, and thereby temporarily hold the valve against further action. When the valve is thus held, it having nearly reached its closed position, a drip or reduced stream will pass from the hopper H and enter the load-receiver, which is then in its partially-tilted position. On the completion of the load by the drip-stream the scale-beam will be moved so that the by-pass stop 41 will be disengaged from the rod 43, and thereby release the valve, so that it can be instantly shut by its own weight, as indicated in Fig. 4, and as it does so it will apply its force and that of the mass of material sustained thereon to the load-receiver and cause the same rapidly to tilt, the force of the valve being transmitted to the load-receiver through a suitable device, such as the rod 50.

The rod 50 is pivoted, as at $z$, to the load-receiver at one side of the axis of movement of the latter (herein shown as the left) when in its primary position, the opposite end of the rod being furnished with the longitudinal loop, as 52, embracing the stud 53 on the offset 54 of the valve.

At the commencement of operation, as shown in Fig. 2, the lower end of the loop will be against the stud, so that the load-receiver can drop from its first to its second position without affecting the valve, the valve, by reason of the rod 50, being held in its wide-open position by and until the load-receiver tilts. At the commencement of the drip period, as shown in Fig. 3, the stud 53 will be at a point between the ends of the loop 52, so that when the valve is released said stud can impinge against the lower end of the loop, and thereby transmit to the load-receiver through the rod 50 a comparatively powerful thrust to cause the same to descend and tilt.

The tripper for the detent or latch D is designated by 55, and it consists of an arm extending laterally from the side frame 3 and against which the stud 21' of the latch is adapted to strike on the completion of the load, so that the arm 23 of the latch will be disengaged from the projection 24 of the load-receiver.

For returning the empty load-receiver to its primary or upright position said load-receiver is furnished with a weight, as 56, of suitable efficiency secured to its rear wall 57, it also having the protuberance 58 thereon adapted to abut against the rod 12 when it reaches its normal position. (Shown in Fig. 2.) The valve V in connection with the rod 50 constitutes a toggle, the several centers of which are designated, respectively, by $x$, $y$, and $z$, (see Fig. 5,) which on the final tilting of the load-receiver are thrown into line, the center of gravity of the load-receiver-returning weight 56 being also on a line passing through the several centers, whereby said load-receiver is held in its discharging position until the toggle is broken. The valve and the rod 50 also serve to hold the load-receiver down, the projection 30 being also in line with the points $x$, $y$, and $z$, so that the beam-weight W is located in its shifted position, as will be evident from an inspection of Fig. 5. For the purpose of securing a more even action of the valve and load-receiver the rod 50, which I have described, has a companion rod 50', movable in parallelism therewith and pivoted, as at $z'$, to the load-receiver, the loop at the upper end of said rod being designated by 52' and embracing the stud 53' on the offset 54' of the valve V at a point opposite the offset 54.

The toggle-breaking means in the present case are connected with a regulator, such as R, below the weighing mechanism and designed to be intermittingly acted upon by the loads discharged therefrom. The toggle-breaker is designated by 60, it consisting of an arm on the hub or sleeve 61, through which a pivot 62 on the bracket 63 of the hopper H extends, said hub or sleeve 61 being furnished with a crank-arm 64, connected with the regulator by the rod 65. The toggle-breaking arm 60 has at its outer end a by-pass device 66, of ordinary construction, pivoted thereto and held in its normal position by the flat spring 67, secured to the main portion of the arm, said by-pass being adapted to pass by a part connected with the valve without breaking the toggle or affecting the relation of the parts; but on the return stroke it is adapted to throw the several centers of the toggle out of line, thereby to release the load-receiver G, so that it can be returned to its primary position by the weight 56 and the beam-weight W.

A bar is shown at 70 loosely fitted to the valve-support 30 and adapted to be engaged by the toggle-breaker 60, the valve V being furnished with the forwardly-extending arm 71, having a lateral extension 73, designed to engage the under face of the bar or rod 70. As the valve closes, the bar 70 will be carried therewith until it abuts against the stops 74 on the bracket 63, at which time the valve is closed, and through the toggle hereinbefore specified is locked in such condition. It will be apparent that when the bar 70 is struck the several centers of the toggle will be thrown out of line to release the load-receiver G, and consequently the scale-beam B.

The regulator R, to which I have hereinbefore referred, consists of a frame, as F, and a series of bars or slats, as 80, secured at their opposite ends to the longitudinal members 81 and 82 of the frame, said frame members being joined by the cross-bar 83. The slats or bars, which are made flat, are disposed obliquely in the frame F, so as to be acted upon by the material discharged from the load-receiver, whereby the regulator can be shifted from its highest to its lowest position (shown, respectively, in Figs. 2 and 5) by the material discharged from the load-receiver, the mass acting against the several flat blades to hold the regulator down. By reason of the oblique or angular disposition of the respective regulator-blades 80, to which I have just referred, a greater surface is presented against which the falling material from the load-receiver can act, such construction also permitting the effective use of a comparatively large number of blades in a relatively small space. On the return stroke of said regulator it is adapted to actuate the toggle-breaker 60 for throwing the several centers $x$, $y$, and $z$ out of line. The regulator is supported for oscillatory movement, the pivots 85 and 86 passing through the longitudinal members of the frame. The two members 81 and 82 of the frame are continued forward beyond their pivots in the form of arms 87 and 88, joined by the counterweight 89, which serves as a convenient means for returning the regulator to its primary position when the material discharged from the load-receiver has passed therefrom, said regulator on its return stroke being adapted, as hereinbefore stated, to operate the toggle-breaker 60. The pivot 85 has secured thereto the crank-arm 90, to which is pivoted the connecting-rod 65. When the material is discharged from the load-receiver, the valve at this time being closed, it will strike the regulator and force the same down, the rod 65 thereby being thrust upward and the by-pass 66 being caused to engage and pass by the bar 70, as shown in Figs. 5 and 8, until it reaches a point above the same, as shown in dotted lines in Fig. 8.

Figure 5:
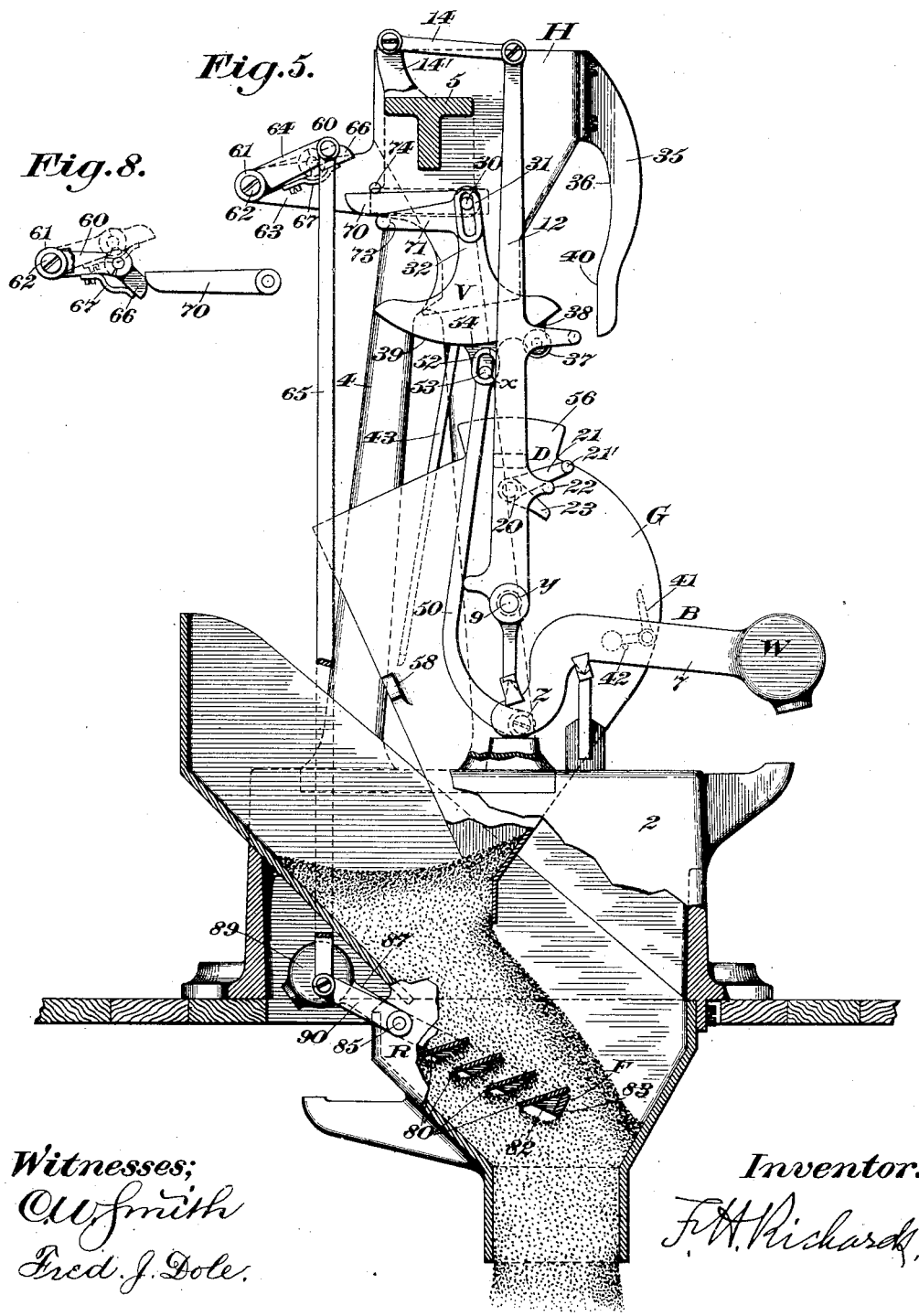
Figure 6:
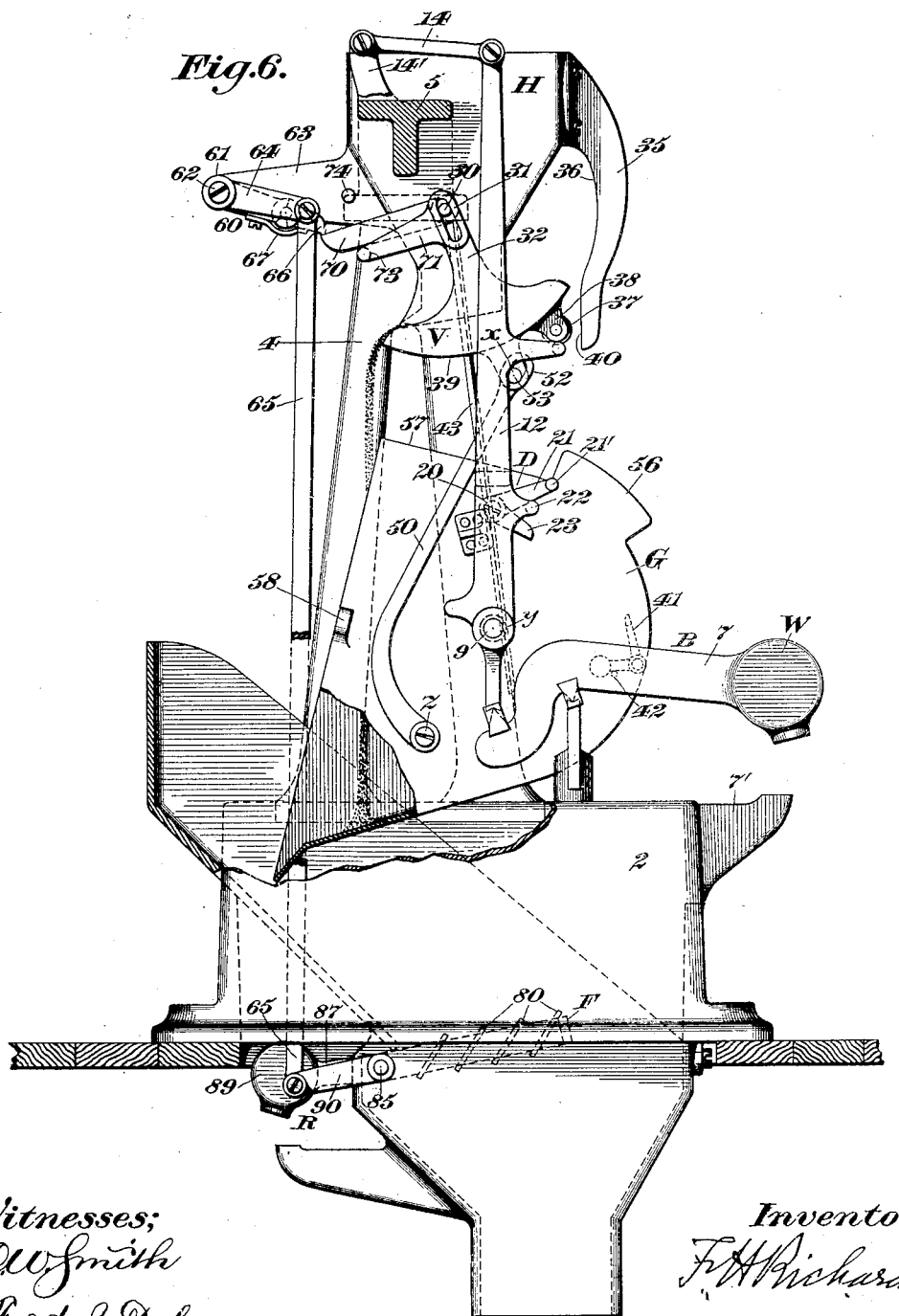

When the parts are in the position shown in Fig. 5, the load-receiver and beam will be locked against return movement and the toggle-breaker 60 will be at a point above the bar 70. When the regular has nearly reached its normal position, it being returned by the dropping of the counterweight 89, the arm or toggle-breaker 60 will strike the bar 70 and by acting against the valve will force the centers $x$, $y$, and $z$ out of line, as indicated in Fig. 6. When this takes place, the load-receiver can be returned to its primary position by the weight 56 and the beam-weight W.

As the parts return to their primary positions the load-receiver will force the rod 50 upward, and said rod being connected with valve V the latter will thereby be opened, the projection or antifriction-roll 37 being caused to ride along the curved surface 36 of the guide-track 35.

The operation of the hereinbefore-described machine, briefly set forth, is as follows: Fig. 2 shows the positions occupied by the different parts at the commencement of operation, the beam-weight resting on its support 7' and 8' and the load-receiver being empty and in its primary position. The valve is represented as being wide open and the supply-stream as flowing into the load-receiver, in which position it is held by the load-receiver acting through the rod 50. When the load-receiver is empty, as hereinbefore stated, it will be by its own weight maintained in the position in which it is shown in Fig. 2. When a certain proportion of the load has been received, the load-receiver will descend, and at a point succeeding this time the center of gravity of the load-receiver, by reason of the loading of the same, will shift to the left-hand side of the axis of movement of the load-receiver, whereby the latter can tilt to the position illustrated in Fig. 3 or until the projection 24 abuts against the latch D. When the load-receiver tilts, as thus specified, the valve V will be released and can close to its drip position, (shown in said Fig. 3,) or until the rod 43 abuts against the by-pass stop 41 on the beam, the valve thereby being held. The drip-stream will then flow into the load-receiver to complete the load. When the load is completed, the stud 21' on the latch will strike the tripping device 55 on the side frame 3, the latch thereby being disengaged from the projection 24, whereby the load-receiver and valve V are released, the load-receiver being thereby free to tilt to the positions shown, respectively, in Figs. 4 and 5, the valve at this time throwing the toggle-centers $x$, $y$, and $z$ into line, as indicated in Fig. 5. When the load is discharged from the load-receiver G, it will strike and shift the regulator, thereby through the intermediate connections forcing the toggle-breaker 60 to a point above the bar 70. When the material has passed from the regulator R, it can be returned to its initial position by the dropping of the counterweight 89, so that the rod 65 will be drawn downward and the toggle-breaker 60 carried into engagement with the bar 70, whereby through the valve the toggle, consisting of the valve and the rod 50, is broken, thereby to unlock the load-receiver and beam B, so that these parts can be returned to their normal positions (shown in Fig. 2) by the weight 56 of the load-receiver and the beam-weight W to repeat the operation.

Having described my invention, I claim—

1. The combination of weighing mechanism embodying a load-receiver; a hopper; and a valve supported for reciprocatory movement in planes transverse to each other and bodily movable independently of the hopper toward and from the load-receiver on one of its reciprocations.

2. The combination of weighing mechanism embodying a load-receiver; a valve supported for reciprocatory movements in planes transverse to each other and independently of the hopper; and a connection between the valve and the load-receiver.

3. The combination of weighing mechanism embodying a tilting load-receiver; a hopper; a valve supported for reciprocatory movement in planes transverse to each other and independently of the hopper; and a connection between the valve and the load-receiver.

4. The combination of a hopper; a valve supported for reciprocatory movement in planes transverse to each other; and means independent of the hopper for causing the operation of the valve through a predetermined path.

5. The combination of a hopper; a valve and its support, the valve being so constructed as to move in transverse planes relatively to each other and having a projection; and a guide-track having a curved surface defined by an arc struck from the center of the valve-support.

6. The combination of a hopper; a valve supported for reciprocatory movements in planes transverse to each other; means for causing the operation of the valve through a predetermined path for a predetermined length of time; and means for arresting the progress of the valve.

7. The combination of weighing mechanism; a hopper; a valve supported for reciprocatory movements in planes transverse to each other and having a projection; a guide-track having a curved surface defined by an arc struck from the center of the valve-support and on which said projection travels; and means carried by the weighing mechanism for arresting the progress of the valve substantially at the time the projection thereon passes out of contact with said curved surface.

8. The combination, with mechanism embodying a load-receiver, of a hopper having a projection; a valve provided with a loop embracing said projection; and a connection between the valve and load-receiver and serving with said valve as a toggle to lock said load-receiver.

9. The combination of weighing mechanism embodying a load-receiver; a supply-valve; and a rod connected, respectively, with the valve and load-receiver, said valve and rod constituting a toggle adapted to lock the receiver against movement.

10. The combination of weighing mechanism embodying a tilting load-receiver; a supply-valve mounted for movement in planes transverse to each other; and a rod connected, respectively, with the valve and load-receiver and serving with said valve as a toggle to lock said load-receiver.

11. The combination of weighing mechanism embodying a load-receiver; a toggle connected with the load-receiver for locking the same in its discharging position; a regulator below the weighing mechanism, adapted to be acted upon by the material discharged from said load-receiver; and means operative with the regulator for breaking the toggle.

12. The combination of weighing mechanism embodying a tilting load-receiver; a regulator situated below and shiftable by the load discharged from the weighing mechanism; a supply-valve; a rod connected, respectively, with the supply-valve and the load-receiver, said valve and rod constituting a toggle for locking the load-receiver in its discharging position; and means connected with the regulator for breaking the toggle.

13. The combination of weighing mechanism embodying a load-receiver; a supply-valve having a projection furnished with a stud; a bar adapted to engage said stud; a rod connected, respectively, with the valve and load-receiver; a regulator in position to be acted upon and shifted by the load discharged from the load-receiver; and a device connected with the regulator for engaging said bar.

14. The combination of weighing mechanism embodying a tilting load-receiver; a supply-valve and its support, said valve having an arm furnished with a stud; a bar loosely carried by the support and adapted to rest against said stud; a rod connected, respectively, with the valve and load-receiver; a regulator in position to be acted upon and shifted by the load discharged from the load-receiver; and a device connected with the regulator for engaging said bar.

15. The combination of weighing mechanism embodying a load-receiver; a hopper; a supply-valve for said hopper, supported for movements in planes transverse to each other and having a projection; a guide-track secured to a depending arm from the hopper and furnished with a guide-surface concentric with the valve-support and against which said projection is adapted to travel; a rod secured to said valve; and a device on the weighing mechanism for engaging said rod substantially at the time the projection passes out of contact with the coöperating guide-surface.

16. The combination of weighing mechanism embodying a tilting load-receiver; a hopper; a supply-valve supported by said hopper for movements in planes transverse to each other; a rod connected with the load-receiver and having a loop at one end embracing a stud on the valve; a bar loosely carried by the support of the valve; an arm on said valve, having a stud on which said bar is adapted normally to rest; a regulator situated in position to be acted upon and shifted by the load discharged from the weighing mechanism; a crank-arm on the regulator; a device for engaging said member; a crank-arm secured to said device; and a rod pivoted, respectively, to said crank-arms.

17. The combination of a load-receiver supported for tilting movement and so mounted that when empty its center of gravity is located at one side of its center of movement, said center of gravity being changed to the opposite side of the center of movement as the load is built up; a projection on the load-receiver; and a latch disposed in the path of movement of said projection, situated remotely therefrom when the load-discharger is empty, whereby said load-receiver will be maintained by its own weight in its primary position for a predetermined length of time, and whereby it will be caused to tilt when a certain quantity of material is received and until said projection strikes the latch.

18. The combination of a load-receiver supported for tilting movement and so mounted that when empty its center of gravity is located at one side of its center of movement, said center of gravity being changed to the opposite side of the center of movement as the load is built up; a projection on the load-receiver; a latch disposed in the path of movement of said projection and remotely situated therefrom when the load-receiver is empty, whereby said load-receiver will be maintained by its own weight in its primary position for a predetermined length of time, and whereby it will be caused to tilt when a certain quantity of material is received and until said projection strikes the latch; and means for tripping said latch on the completion of a load.

FRANCIS H. RICHARDS.

Witnesses:
F. N. CHASE,
ANDREW FERGUSON.